United States Patent [19]

Schroder

[11] 4,091,863

[45] May 30, 1978

[54] REVERSIBLE LATENT HEAT STORAGE METHOD, AND REVERSIBLE LATENT HEAT ACCUMULATOR

[75] Inventor: Johann Schroder, Aachen, Germany

[73] Assignee: U.S. Philips Corporation, New York, N.Y.

[21] Appl. No.: 676,718

[22] Filed: Apr. 14, 1976

[30] Foreign Application Priority Data

Apr. 23, 1975 Germany .................... 2517921

[51] Int. Cl.² ............... F25D 3/00; F24H 7/00; F25D 11/00; F28F 23/02

[52] U.S. Cl. .......................... 165/1; 62/59; 62/437; 126/400; 165/104 S; 165/132; 165/DIG. 4

[58] Field of Search ............. 126/400; 62/59, 437; 165/104 S, 104 M, 132, 1, DIG. 4, 62

[56] References Cited

U.S. PATENT DOCUMENTS

| | | | |
|---|---|---|---|
| 2,677,243 | 5/1954 | Telkes | 165/DIG. 4 |
| 2,677,664 | 5/1954 | Telkes | 126/400 |
| 2,847,190 | 8/1958 | Slattery | 165/62 |
| 2,902,839 | 9/1959 | Marshall | 165/DIG. 4 |
| 2,996,894 | 8/1961 | Shade | 62/59 |
| 3,318,372 | 5/1967 | Shell | 165/62 |
| 3,517,732 | 6/1970 | Brebant | 165/132 |
| 3,563,304 | 6/1971 | McGrath | 165/62 |
| 3,596,713 | 8/1971 | Katz | 165/DIG. 4 |
| 3,720,198 | 3/1973 | Laing et al. | 126/400 |
| 3,779,232 | 12/1973 | Schroder | 126/400 |
| 3,986,969 | 10/1976 | Telkes | 126/400 |

*Primary Examiner*—Charles J. Myhre
*Assistant Examiner*—Sheldon Richter
*Attorney, Agent, or Firm*—Frank R. Trifari; Rolf E. Schneider

[57] ABSTRACT

Utilization of latent heat stored in a crystalline liquid heat storage medium subject to super-cooling by continuously circulating the storage medium past a heat exchanger positioned in the upper portion of an enclosed space containing a body of such storage medium to effect super-cooling thereof, then past a bed of seed crystals in the lower portion of such space to effect partial crystallization thereof, and then back past the heat exchanger.

6 Claims, 3 Drawing Figures

REVERSIBLE LATENT HEAT STORAGE METHOD, AND REVERSIBLE LATENT HEAT ACCUMULATOR

This invention relates to a method of reversibly storing latent heat in a heat storage medium comprising a liquid phase part and a solid phase part wherein heat is stored by melting the solid phase part of the heat storage medium and wherein the liquid phase part is subjected to super-cooling.

A known advantage of the storage of latent heat over the storage of sensible heat (for example, in water, stone or earth), which is accompanied by a rise in temperature, consists in that the heat is taken up and given off at a constant temperature which is optimally adapted to the relevant application. Moreover, latent heat accumulators generally have a higher storage capacity per unit of volume and weight; this notably holds true for the water/ice system and some salt hydrates (M. Telkes, ASHRAE Journal 16, Sept. 1974, pp. 38–44).

A known disadvantage of the storage of latent heat, which becomes manifest notably when salt hydrates are used as the heat storage medium, consists in that the hydrates exhibit only a small tendency to nucleate and a low crystallization velocity, so that super-cooling occurs, which means that when the heat storage medium is cooled below its melting point, no solidification of the heat storage medium occurs, and hence, neither is the melt enthalpy given off. Consequently, such a latent heat storage medium does not crystallize or crystallizes slowly, so that even at a much lower temperature than the melting point the melting heat cannot be utilized. In order to solve this problem, it is known to add nucleating materials (seed crystals) to the heat storage medium which do not dissolve in the heat storage medium but which, because of their structure and surface condition, substantially increase the number of nuclei formed. However, because of the low crystallization velocity, these nucleating agents must be finely dispersed in the heat storage medium. This can be achieved by solidifying the heat storage medium containing the nuclei by the addition of an organic (for example gelatine) or inorganic (for example, water-glass) colloidal carrier material with the formation of a gel (German Offenlegungsschrift 1,928,694) or by absorption by a porous carrier material (German Offenlegungsschrift 1,937,804).

A major disadvantage consists in that gels of this kind age comparatively quickly and in that the carrier structures disintegrate notably in the case of repeated changes of temperature. Moreover, the thermal conductivity of such gels is very low, and the heat charging and the heat discharging must be performed so as to be distributed over the entire volume of the heat storage medium.

The invention has for its object to provide a method whereby heat can be applied to and extracted from the super-coolable heat storage medium in a simple manner.

In order to achieve this object, the method according to the invention is characterized in that (i) the heat storage medium is charged by being conducted past a heat exchanger having a temperature above the melting point of the heat storage medium and (ii) is discharged by (a) the temperature of the heat exchanger being kept at a sufficiently low value below this melting point and (b) the flow rate of the heat storage medium near the heat exchanger being maintained at a sufficiently high value so that no or substantially no crystallization of the heat storage medium occurs near the heat exchanger and that no or substantially no crystals are deposited on the heat exchanger, the liquid phase part of the heat storage medium which is supercooled and super-saturated subsequently being conducted past a location where a crystal nucleating material is present or past the heat storage medium solidified at this location so that the super-saturated part of the heat storage medium is solidified and separated and the remaining liquid heat storage medium is returned to the heat exchanger.

In the method according to the invention, the usually detrimental supercooling tendency of the heat storage material is used in a positive sense for storing heat in and extracting heat from this heat storage medium in a simple manner, without carrier materials spread through the entire volume of the heat storage medium or dispersions of seeds being required.

In a preferred embodiment of the method in accordance with the invention, the surface of the heat exchanger is briefly heated above the melting point of the heat storage medium in the case of crystal formation on the heat exchanger. This can be effected by reversing a heat pump in which the heat exchanger is included.

An aqueous solution of 44 to 48% by weight KF is preferably used as the heat a heat storage medium. $Na_2SO_4 \cdot 10H_2O$ is also very suitable.

The invention furthermore relates to a reversible latent heat accumulator which is suitable for performing the described method and which comprises at least one closed reservoir containing a heat storage medium which tends to supercooling and which takes up heat by melting.

The reversible latent heat accumulator according to the invention is characterized in that the reservoir includes a heat exchanger, a location where a crystal nucleating material for the heat storage medium is present, and a pumping device for circulating liquid heat storage medium between the said heat exchanger and said location.

A preferred embodiment of the heat exchanger in accordance with the invention is characterized in that the heat exchanger is covered by an inflatable foil envelope.

A further preferred embodiment of the heat accumulator in accordance with the invention is characterized in that the reservoir includes guide faces or guide pipes for conducting the flow of liquid heat storage medium.

In another preferred embodiment of the heat accumulator in accordance with the invention, the heat exchanger forms part of a heat pump.

The invention will be described in detail hereinafter with reference to the accompanying drawings, in which.

Figure 1:
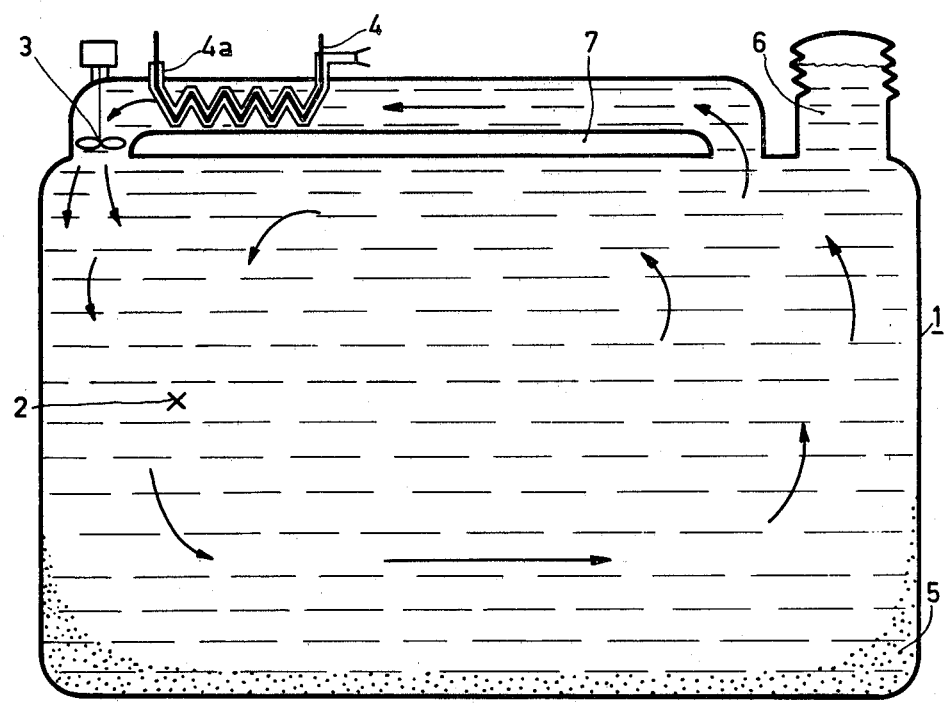
FIG. 1 is a longitudinal sectional view of an embodiment of the latent heat accumulator in accordance with the invention, and also illustrates the principle of the method in accordance with the invention.

The reference 1 in FIG. 1 denotes a closed reservoir containing a heat storage medium in the form of a salt hydrate 2, for example, an aqueous solution of 44 to 48% by weight KF, a pumping device 3, and a heat exchanger 4. A small quantity of a crystal nucleating material 5 for the heat storage medium is provided on the bottom and the side-walls of the reservoir.

The reservoir 1 furthermore includes a device 6 for compensating for the pressure and the level of the heat storage medium. Guide faces 7 are also provided.

Assuming that the accumulator has been charged, so that the heat storage medium is in the liquid phase, the discharging is effected as follows.

Figure 2:
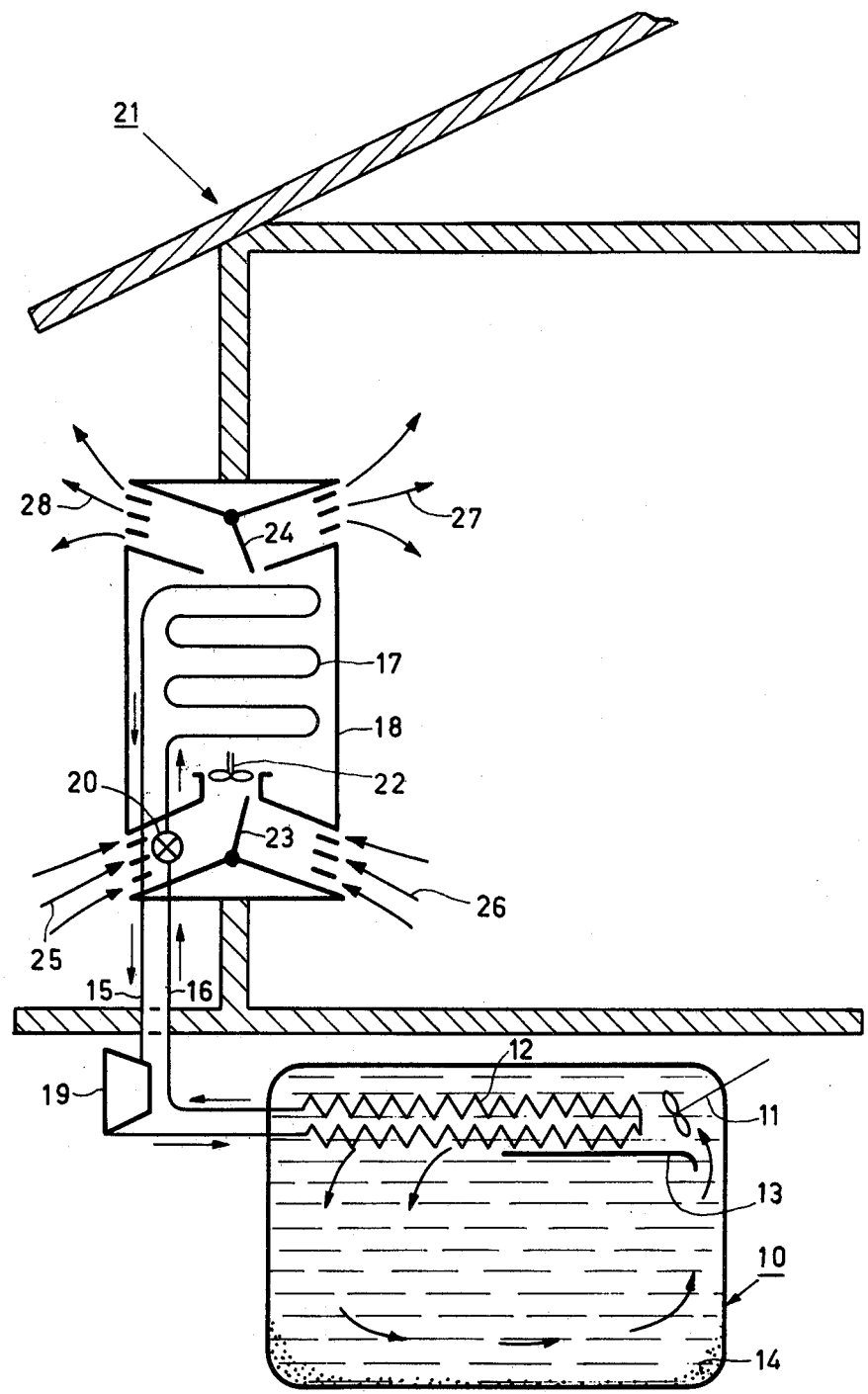
FIGS. 2 and 3 are longitudinal sectional views of a combination of an embodiment of the latent heat accumulator in accordance with the invention and a heat pump for cooling or heating a house in summer (FIG. 2) and in winter (FIG. 3), respectively.
Figure 3:
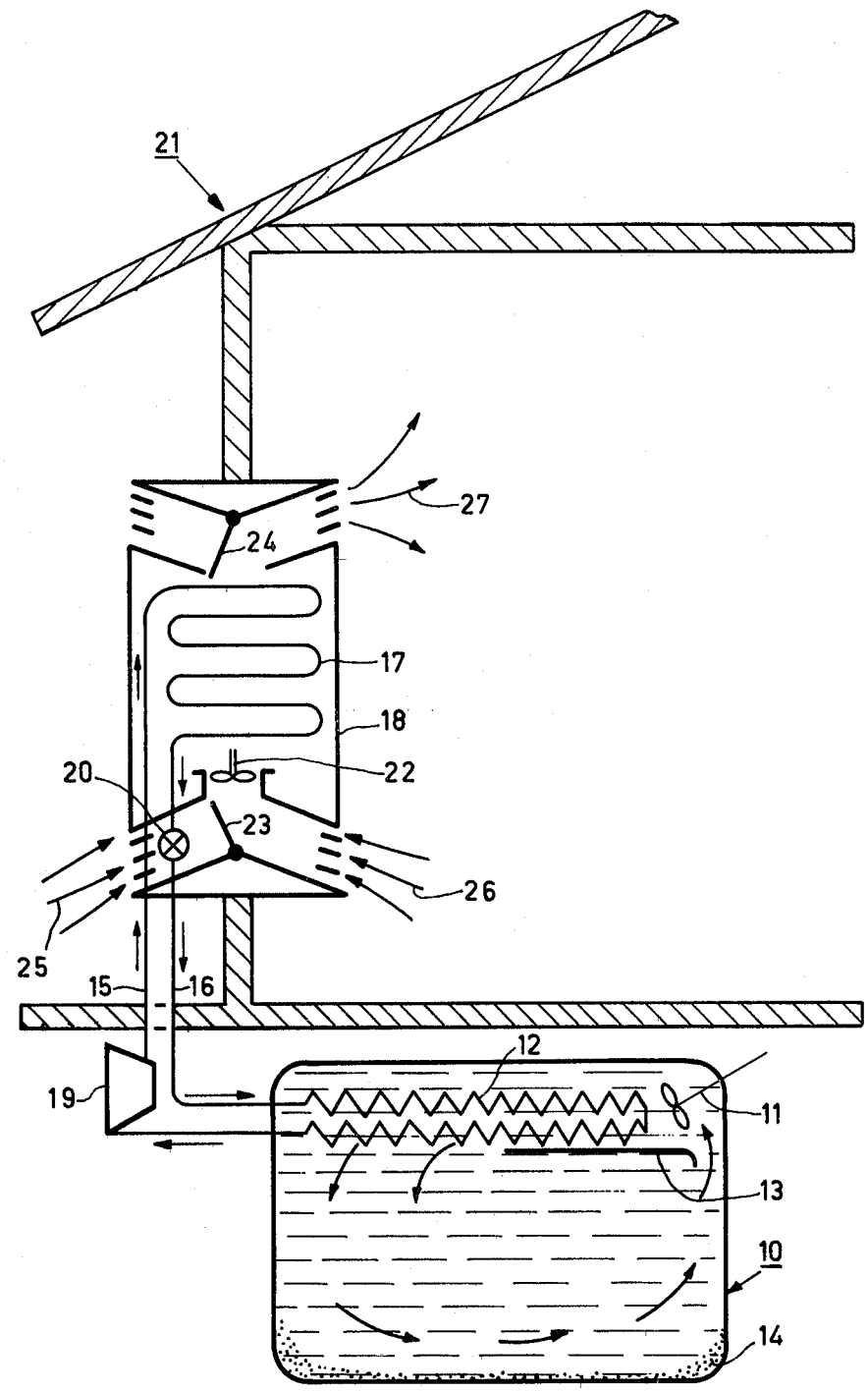

The pumping device 3 conducts the liquid heat storage medium past the heat exchanger 4, so that the heat storage medium is cooled by the heat exchanger (for example, directly via the evaporator of a heat pump, FIGS. 2 and 3). The melt 2 is cooled to a temperature which is only slightly (for example, approximately 5° C) below its melting point. This method of cooling, in conjunction with a suitably chosen minimal flow rate of the heat storage medium passing the heat exchanger 4, ensures that the nucleation and the crystallization velocity of the heat storage medium are so small at the area of the heat exchanger 4 that no or almost no solid phase is separated at this area. The supercooled heat storage medium is subsequently passed over the crystal nucleating material 5 while giving off the melt enthalpy. The supercooling and the supersaturation of the passing melt 2 are eliminated at this area due to the crystallization then occurring. Subsequently, the remaining melt is again conducted, via the guide faces 7, past the heat exchanger 4. Following the initial crystallization by means of the crystal nucleating material 5, further crystallization can take place by the solidified heat storage medium then present at this area. Obviously, the heat accumulator may be discharged only to the extent that enough liquid heat storage medium is still present for heat exchange with the heat exchanger 4. Depending on the dimensions and the construction of the accumulator, only a very small quantity of heat storage medium is required for this purpose (1% or less).

Any crystal growth on the heat exchanger 4 after prolonged operation can be removed by periodically slightly inflating an envelope 4a of synthetic foil provided on the heat exchanger 4 by means of a pump or bellows, so that the crystals are loosened. It is alternatively possible to periodically operate the heat pump briefly in the opposite direction (FIGS. 2 and 3), so that the crystals are melted. Melting can also be achieved by electric heating.

In the case of charging, the heat exchanger 4 has a temperature which is higher than the melting point of the heat storage medium. The pumping device 3 again provides the circulation of liquid heat storage medium past the heat exchanger 4 and subsequently past solidified storage medium to be melted.

The reference 10 in FIG. 2 denotes a latent heat accumulator in which a pumping device 11, a heat exchanger 12 and a flow guide partition 13 are arranged. On the bottom of the accumulator 10 there is provided a small quantity of a crystal nucleating material 14 for the heat storage medium, which can circulate in the liquid phase in the accumulator 10 in the direction denoted by the arrows.

The heat exchanger 12 communicates, via ducts 15 and 16, with a heat exchanger 17 in a housing 18. The duct 15 includes a compressor 19 and the duct 16 includes an expansion valve 20. The reference 21 denotes the house to be cooled.

There are also provided a fan 22 and valves 23 and 24.

During operation in summer, hot or warm outside air 25 and/or warm air 26 from the house 21 is drawn by the fan 22. The ratio between these air flows is controlled by the valve 23. The air gives off heat to the heat exchanger 17 and flows as cool air 27 into the house 21 and/or flows to the outside as cool air 28. The ratio between these air flows is controlled by the valve 24.

A heat transport medium, for example, a fluorocarbon, heated in the heat exchanger 17, is sucked by the compressor 19 and is further heated by compression. After the compression, the heat transport medium flows through the heat exchanger 12 while giving off heat to the accumulator 10. Subsequently, the pressure of the heat transport medium is reduced in the expansion valve 20 and, being a cold, low-pressure medium, it is heated again in the heat exchanger 17.

FIG. 3 shows the operation in winter. Cold outside air 25 and/or lukewarm inside air 26 is drawn by the fan 22 via the valve 23 and is heated by the heat transport medium in the heat exchanger 17. The heated air 27 flows into the house 21. The valve 24 keeps the connection with the outside atmosphere closed.

The compressor 19 now operates in the reverse direction and sucks the heat transport medium which has been heated in the accumulator 10. After the compression, further increasing the temperature of the heat transport medium, this medium flows through the heat exchanger 17 whereby it is cooled. Subsequently, its pressure is reduced in the expansion valve 20, so that it is further cooled. Heat, from the accumulator, is then taken up again in the heat exchanger 12.

Obviously, the heat exchanger 17 can also serve for heating water. It is alternatively possible to store solar energy in the accumulator, for example, by circulating the heat storage medium directly past or through a solar energy collector.

What is claimed is:

1. A method of utilizing latent heat stored in a crystallizable liquid heat storage medium subject to supercooling, which comprises providing a body of said storage medium in an enclosed space associated with a heat exchanger and having a bed of seed crystals in the lower portion thereof, maintaining the heat exchanger at a temperature below the melting point of the storage medium, continuously circulating the storage medium past the heat exchanger to effect super-cooling thereof and past the seed crystal bed to effect partial crystallization thereof and back past the heat exchanger, and maintaining the flow rate of the storage medium past the heat exchanger at a sufficiently high value so that no or substantially no crystallization of the storage medium occurs near the heat exchanger and no or substantially no crystals are formed on the heat exchanger.

2. A method according to claim 1, in which the heat exchanger is positioned in the upper portion of said enclosed space.

3. A method according to claim 1, in which the storage medium comprises an aqueous solution of 44 to 48% by weight KF.

4. A method according to claim 1, in which the storage medium comprises $Na_2SO_4 \cdot 10H_2O$.

5. A method according to claim 1, in which the temperature of the heat exchanger is briefly raised above the melting point of the storage medium in the event of crystal formation on the heat exchanger.

6. A method according to claim 5, in which the temperature of the heat exchanger is raised by reversal of a heat pump including said heat exchanger.

* * * * *